(12) United States Patent
Samuel

(10) Patent No.: US 9,605,969 B2
(45) Date of Patent: Mar. 28, 2017

(54) MEETING COORDINATION UTILIZING PROFILE AND PROXIMITY INFORMATION OF PRIMARY PARTIES AND AFFILIATED SECONDARY PARTIES

(71) Applicant: BarkHappy Inc., Austin, TX (US)

(72) Inventor: Ninis Samuel, Austin, TX (US)

(73) Assignee: BarkHappy Inc., Austin, TX (US)

( * ) Notice: Subject to any disclaimer, the term of this patent is extended or adjusted under 35 U.S.C. 154(b) by 0 days.

(21) Appl. No.: 15/161,573

(22) Filed: May 23, 2016

(65) Prior Publication Data

US 2016/0265928 A1 Sep. 15, 2016

Related U.S. Application Data

(63) Continuation of application No. 14/481,172, filed on Sep. 9, 2014, now Pat. No. 9,347,783.
(Continued)

(51) Int. Cl.
| | |
|---|---|
| *G01C 21/34* | (2006.01) |
| *H04W 4/02* | (2009.01) |
| *A01K 29/00* | (2006.01) |
| *H04L 12/18* | (2006.01) |
| *H04L 29/08* | (2006.01) |
| *A01K 15/02* | (2006.01) |

(Continued)

(52) U.S. Cl.
CPC ........ *G01C 21/3438* (2013.01); *A01K 15/021* (2013.01); *A01K 29/00* (2013.01); *H04L 12/1813* (2013.01); *H04L 51/20* (2013.01); *H04L 67/18* (2013.01); *H04W 4/023* (2013.01); *G01C 21/3476* (2013.01); *G06Q 10/1095* (2013.01); *G06Q 50/01* (2013.01); *H04L 51/32* (2013.01)

(58) Field of Classification Search
CPC ............ G01C 21/3438; G01C 21/3476; A01K 15/021; A01K 29/00; H04L 12/1813; H04L 51/20; H04L 51/32; H04L 67/18; H04W 4/023; G06Q 10/1095; G06Q 50/01

See application file for complete search history.

(56) References Cited

U.S. PATENT DOCUMENTS

| 6,424,910 B1 | 7/2002 | Ohler et al. |
| 7,058,507 B2 | 6/2006 | Saiki |

(Continued)

*Primary Examiner* — Todd Melton
(74) *Attorney, Agent, or Firm* — Garlick & Markison; Harry S. Tyson, Jr.

(57) ABSTRACT

A method and system for establishing a meeting location for affiliates of primary users of mobile devices. In various embodiments, geolocation information from first and second mobile devices in proximity to first and second affiliated parties, respectively, is used to identify a meeting location. The affiliated parties (e.g., human babies or dogs) may be unable to meaningfully and independently interact with a mobile device. Directions to the meeting location are communicated to each of the mobile devices, as well as location information regarding the other mobile device. Social profile information regarding a user of a mobile device and an affiliated party may also be provided to other potential meeting participants. Proximity of an affiliated party to a mobile device may be determined from electronic data received from a device coupled to the affiliated party. Further, potential points of interest culled from a curated database may be communicated for display.

20 Claims, 7 Drawing Sheets

Related U.S. Application Data

(60) Provisional application No. 61/875,323, filed on Sep. 9, 2013, provisional application No. 61/905,349, filed on Nov. 18, 2013.

(51) Int. Cl.
*H04L 12/58* (2006.01)
*G06Q 50/00* (2012.01)
*G06Q 10/10* (2012.01)

(56) References Cited

U.S. PATENT DOCUMENTS

| | | |
|---|---|---|
| 7,577,666 B2 | 8/2009 | Overton |
| 7,606,661 B2 | 10/2009 | Kwak |
| 7,729,708 B2 | 6/2010 | Jung et al. |
| 8,204,682 B2 | 6/2012 | Hatami |
| 8,494,764 B2 | 7/2013 | Lappe et al. |
| 8,577,589 B2 | 11/2013 | Shin et al. |
| 8,812,021 B2 * | 8/2014 | Williams ............... H04W 4/023 455/456.1 |
| 9,264,849 B1 * | 2/2016 | Kahn ................. G06Q 10/1095 |
| 2005/0202834 A1 | 9/2005 | Sudit |
| 2009/0105941 A1 * | 4/2009 | Johnston ............ G01C 21/3438 701/533 |
| 2011/0028132 A1 | 2/2011 | Bos |
| 2011/0113148 A1 * | 5/2011 | Salmela ............. G01C 21/3438 709/229 |
| 2012/0204112 A1 | 8/2012 | Levine et al. |

* cited by examiner

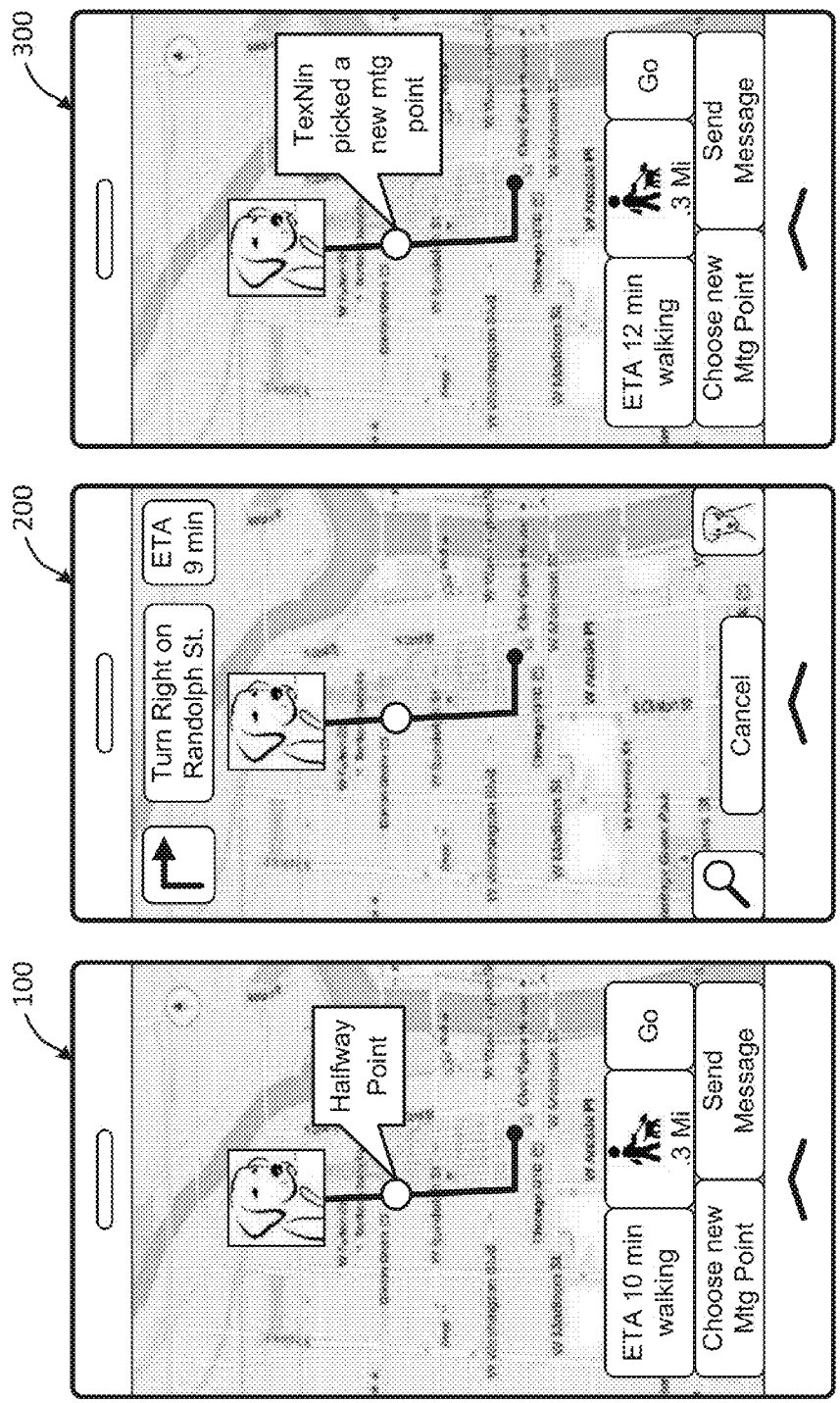

MEETING COORDINATION UTILIZING PROFILE AND PROXIMITY INFORMATION OF PRIMARY PARTIES AND AFFILIATED SECONDARY PARTIES

RELATED APPLICATIONS

The present U.S. Utility Patent Application claims priority pursuant to 35 U.S.C. §120 as a continuation of U.S. Utility application Ser. No. 14/481,172, entitled "PET FRIENDLY SEARCH, MEETING, SOCIAL PROFILE MAPPING SYSTEM", filed Sep. 9, 2014, which claims priority pursuant to 35 U.S.C. §119(e) to U.S. Provisional Application No. 61/875,323, entitled "DOG WALKING/MEETING APP", filed Sep. 9, 2013, and U.S. Provisional Application No. 61/905,349, entitled "SEARCH AND SOCIAL PROFILE MAPPING FOR BABY AND DOG FRIENDLY POINTS OF INTEREST AND THEIR PARENTS", filed Nov. 18, 2013, all of which are hereby incorporated herein by reference in their entirety and made part of the present U.S. Utility Patent Application for all purposes.

BACKGROUND OF THE INVENTION

Technical Field of the Invention

The present invention is directed to the field of directional and/or mapping processes and systems for operation on electronic devices, such as smart phones and similar devices. More specifically, the present invention relates to a social profiling, mapping and meeting coordination involving a secondary party accompanied by a primary party.

Description of Related Art

Typical mapping and navigation applications ("apps") and services today only focus on human users, ignoring other potential beneficiaries such as dogs or even babies. Such apps are meant to be first person experiences, allowing a user to manage a location and a social profile on a map. A 2011 survey by the American Veterinary Medical Association (AVMA) estimated that there are over 43 million households in the United States, about 36.5% of total U.S. households, with at least one dog. In 2012, a study performed by a consumer group estimated that 22% of the World's population, about one out of every five people, will own a smartphone by 2013.

These numbers, while seemingly unrelated, represent two great passions and trends in American and World culture. However, no current solution allows social profiles and mapping services for dogs managed on their behalf by their owner/human. In addition, no current apps or mapping programs combine social profiles for dogs on a map with live location data or dog friendly points of interest used for meeting point determination. Current GPS and location technology is used with dogs only for lost and found tracking purposes, and no existing solution allows the placement of dog social profiles on a map that can be managed on behalf of a dog by a human (their owner), while also allowing interaction and meetings between two or more dogs at dog friendly points of interest.

Further, typical mapping solutions only provide single direction point navigation, such as one person to a single point of interest, or in some cases, one person to the location of another person, or between two cars. None of these systems have been applied to dogs. In addition, although a mapping or navigation system may provide points of interest, there is often no way to determine whether that point of interest is dog friendly. No current no apps/services enable near instantaneous in-person meetings between dogs and dog owners or provide social profiles based on locations, which are also searchable by a set of traits, so that owners of dogs can potentially meet.

As described more fully below, the present invention provides a mapping and social profile system which performs multiple functions in conjunction with a smartphone.

SUMMARY OF THE INVENTIONS

Disclosed herein are improved systems and methods which avoid the disadvantages of prior devices while affording additional operating advantages. Social profile, search, and meeting coordination systems and methods for mobile devices and affiliated secondary parties are disclosed. In one example, the system is in conjunction with a mobile app on a smartphone (or tablet) that provides search, social networking, and mapping for dogs and their owners.

In an embodiment, a method of assisting users with determining a convenient location for a meeting is disclosed. The method comprises providing an initial location for a first mobile device user, providing an initial location for a second mobile device user, determining a meeting point between the first and second device users, and providing directions to the meeting point to the first device user and the second device user.

In another embodiment, a location mapping system is disclosed. The system comprises an electronic device having processing circuitry to implement a mapping capability(ies), a program stored in memory of the electronic device which complements the operation of the mapping capability, including a mapping location for a first user, a mapping location for a second user, at least one point of interest location at a distance midway between the mapping location of the first user and the mapping location of the second user, wherein the program provides directions on the electronic device based on the mapping locations of the first user and the second user relative to the point of interest enabling the first user and the second user to reach the midway point of interest. Alternatively, the program is accessible through the Internet or stored as a cloud-based program.

The disclosed technology can be a feature or function within a larger application or software program. In addition this technology function can exist on various platforms including Apple iOS®, ANDROID™ ("Android"), Windows, and other proprietary software platforms or web based code.

A location finding system and method for users to find dog friendly points of interest, and to provide social profiles of users, including dogs and their owners, based on location, is disclosed. In one example, the system includes a mobile app that provides search, social networking, and mapping capabilities for dog owners.

In another embodiment, a location mapping and social profile system is disclosed. The system comprises an electronic device having mapping capability, a program stored on the electronic device which complements the operation of the mapping capability, wherein the program is capable of creating a social profile for a user, a mapping location for the first user, and a searching feature wherein the social profile of the user can be located by a second user based on a GPS location.

In yet another embodiment, a location mapping and social profile system for dogs and their owners is disclosed. The system comprises an electronic device having mapping capability, a program stored in the electronic device which complements the operation of the mapping capability, wherein the program is capable of creating a social profile for the dog and its owner, a mapping location for the dog and its owner based on real time location data, and a searching feature wherein the social profile of the dog and its owner are located based on GPS location.

The described technology can be a feature or function within a larger application or software program. In addition, this technology can be implemented on various platforms including Apple iOS®, Android, Windows, and other proprietary software platforms or web based code.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

FIGS. 1-3 are screen shot images showing a possible embodiment of mapping operations of the present system;

DETAILED DESCRIPTION OF THE INVENTION

Figure 4:
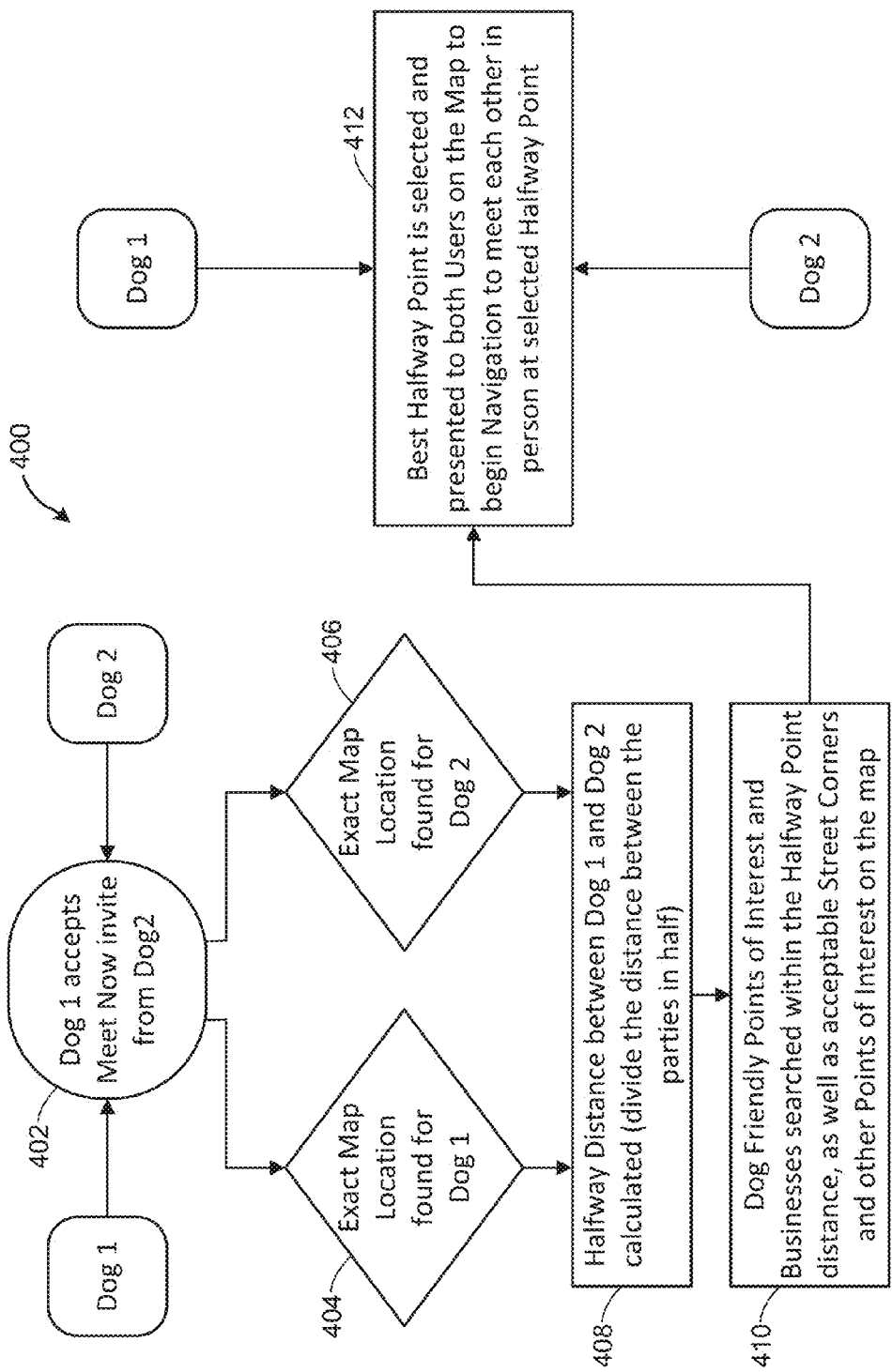
FIG. 4 is a flow chart illustrating exemplary interaction between two users to determine a meeting spot.

The following descriptions of detailed embodiments are for exemplifying the principles and advantages of the inventions. They are not to be taken in any way as limitations on the scope of the inventions. The invention, in its several embodiments, is primarily described in the following text and appended drawings as a component which operates in conjunction with a smart phone or tablet. However, the disclosed system and methods can also be implemented on personal computers including a software application for personal computers, or it may reside on a hosted (server) site as an Internet-based application. Similarly, while it may be described as a supplement to navigation programs, it is equally suitable for stand-alone operation with minor changes which would be understood by those skilled in the art.

The novel concepts and architectures presented herein are not a natural extension of any existing mapping or navigation systems, and change previous assumptions in mapping and social profiles from simply a first person experience, to include a new perspective involving a secondary party (referred to herein in the alternative as a "secondary party" or "affiliated party") not capable of using a device like a smartphone and unable to independently manage a social profile. Although the disclosure references dogs as an exemplary secondary/affiliated party, certain embodiments could be extended to other secondary parties, such as human babies.

The disclosure includes a method that provides a convenient midway or halfway meeting point between two or more secondary parties (such as dogs) on a map, allowing them to meet, via their respective owners, at a convenient location. The display of dog friendly points of interest and specific dog social profiles on a map managed by owners is another exemplary beneficial feature.

In a specific embodiment, the system has multiple components and features. For example, the system:

allows the creation, mapping and searching of social profiles of dogs are managed on their behalf by their human owners and searchable by various traits;

displays dog friendly points of interest and businesses that can be searched by category based on location and used in meeting point determination, including unique icons and POI profile dog friendly information;

allows multiple dogs to meet at a logical dog friendly meeting point, mid-way between their locations, if chosen, instead of one dog traveling all the way to the other dog's location. This saves travel time and distance, and allows for a faster and more efficient meeting. In cases where there are more than two dogs involved, it becomes beneficial to have a mutual logical meeting point versus having to independently determine a meeting point. The present invention uses the location of each dog involved and establishes and recommends the best central meeting point between the dogs. The dog owners can decide to use the recommended meeting point and then receive navigation directions to that point, or change and recommend a different meeting point; and uses a GPS location of each of the dogs based on either the smartphone of their owner or a GPS enabled sensor on the dog and determines the distance between them. It then calculates the exact halfway distance between the parties along what would be a typical one way navigation route. It then processes proprietary dog friendly points of interest and business listings data to search and recommend a logical meeting point within the distance along the route, so that all parties travel the same or nearly the same distance to each other.

Referring to FIGS. 1-6, the described system and method assists dogs and dog owners in finding a convenient halfway or midway meeting point, as well as provides navigational directions between two or more users via a map to facilitate a meeting. The users can be two or more dogs (with connection to the owners). The directions can be given by foot, such as walking directions. Alternatively, aspects of the present invention can also be stored and accessible in the cloud.

Referring to FIGS. 1 and 2, screen shot images 100 and 200 are shown in which a system according to the present invention establishes the location of each of two dogs and the distance between them. Software, which can be executed on a suitable mobile device, including a tablet or smart phone, accessible through the Internet (via a cloud-based server(s)), or as a cloud-based server software, then calculates the halfway distance between the dogs. It then searches proprietary dog friendly map data and business listings to find and recommend a logical meeting point within this distance, so that all parties travel the same or nearly the same distance to each other.

For example, and with reference to the flow chart 400 of FIG. 4, the mobile app is used for connecting two users ("Dog 1" and "Dog 2") walking their dogs. After Dog 2 accepts an invitation to meet from Dog 1 (402), the app notes the map location of the two users (404 and 406). It then looks for dog friendly points of interest (POI) (410) that are at a halfway distance point (calculated at 408) and recommends one of these dog friendly businesses or areas as the halfway meeting point. The halfway meeting point is selected and presented (412) to both "Dog 1" and "Dog 2," who then begin navigation to meet each other in person at the selected halfway point. The parties should both have approximately the same distance to travel to meet each other at this halfway meeting point.

If there is no dog friendly business or POI at exactly the halfway point between the parties, the app looks at locations within, for example, no more than a two block radius of the halfway meeting point (this radius distance can be adjusted). If there is no dog friendly POI within this halfway point area, the software searches for an acceptable street corner or other POI on the map and establishes that as the halfway meeting point. The logic may ensure the existence of a sidewalk or POI so as not to use highways or roads as meeting points. All of this is calculated and processed automatically for the user instantly. Once the halfway meeting point is established on the map and presented to the parties involved, navigation directions (on foot or by car or other, such as mass transportation) are offered to each of the parties to begin their travel to meet in person.

Referring now to the screen shot image 300 of FIG. 3, if one of the dog owners does not want to use the established halfway point, he or she can choose a new meeting point by simply moving the meeting point with his/her finger on the map. The new point is then recommended to the other user(s) to accept or decline. If the second or other user(s) accepts the change, a new meeting point is established.

Another unique aspect of the invention, in addition to calculating and finding a midway or halfway point, is that it provides the best recommended central meeting point by applying smart logic utilizing available data points. This logic may be based on having proprietary dog friendly data from the map, business listings, street information, POIs, etc. For example, the BARKHAPPY® mobile app uses a database of dog friendly businesses and points of interest to first search those that are located at the halfway/midway point for mutual dog walking users.

A first level of logic will choose from dog friendly parks, bars, restaurants, and stores first, followed by all other miscellaneous dog friendly POIs along the route. A second level of logic is used if no dog friendly POIs exist at the midway point (or within a 2 block radius). This second logic uses any existing businesses or POIs that exist at that location, calling upon existing public map data, and avoids using highways or points in middle of streets. This logic identifies businesses or street corners that are accessible on foot. In addition to choosing one meeting point, the logic involved can provide parties with multiple meeting points to choose from instead of just one. In this manner, the present app offers a number of options for the user to choose from when deciding on a meeting place.

In addition to providing a system and methods to assist users in the search and display of dog friendly points of interest and businesses, an embodiment of the invention also provides searchable social profiles for dogs and their owners.

Figure 5:
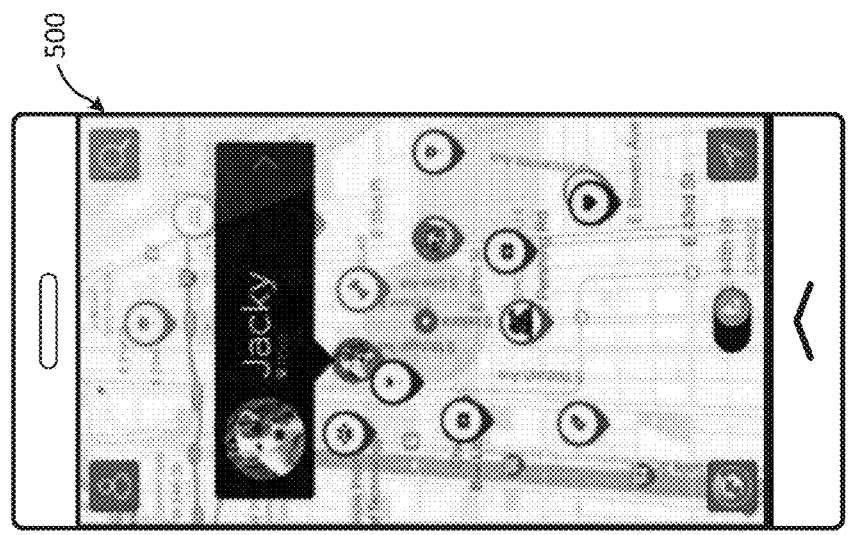
FIG. 5 is a screen shot image showing an embodiment of the social component of the present system with a proximity feature.

FIG. 5 illustrates a screen shot image 500 showing an embodiment of the social component of the present system with a proximity feature which displays dog friendly points of interest (POI), as indicated by a marker such as a paw print, as shown. In operation, the location of the dog owner with the dog is found using the GPS on a smartphone which is running, for example the "BarkHappy" app. This allows the device to identify the dog as "nearby" to other users as well. The locations of the dog friendly places and points of interest are pulled from a proprietary set of data used by the app, which then places the points of interest on a map with the unique markers depending on the category.

In addition, POI of various categories may be culled from a managed database. The database may be accessed when a user performs a search. Items are placed on the map using respective addresses, and the icon used depends on the POI category.

Figure 6:
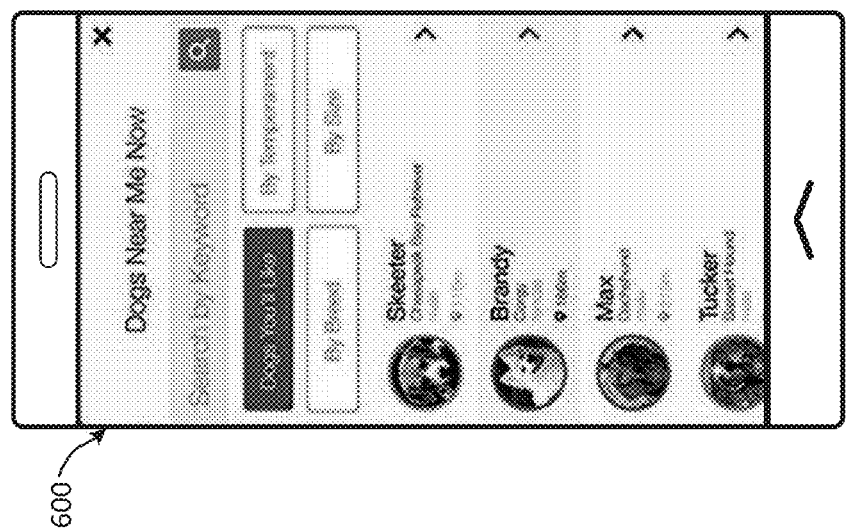
FIG. 6 is another screen shot image showing a search feature of the social component of the present system.

FIG. 6 illustrates another unique feature of the present system, the location-based display 600 of a social profile for a dog and/or dogs along with their owner(s) profile(s). The profiles are preferably searchable by a variety of traits.

The social profile display by location function is also unique in that it uses the dog owners GPS location from the smartphone as well as the city and state location identified in their profile created by the user. Alternatively, the location may be determined by a small sensor attached to the dog. When searching for "Dogs" nearby, a list of dogs nearby may be shown by distance and other factors (see FIG. 6). The dog profiles in the list are found using GPS location of the dog owners smartphone, for example. Users have the option to turn this feature off and not be shown in the list, and decide whether to be visible to the public or not. The display also provides recommended profiles of potentially compatible dogs based on multiple traits including age, location, breed, temperament, size and gender.

Once a user sees another dog profile of interest, the user can open the profile, which allows the user to see pictures of the dog and owner, and preferably read information about the dog, such as age, breed, gender and temperament. The user can then decide to add the dog as a friend in the "pack" or possibly meet for an instant play date.

Also as shown in FIG. 5, the app may display social profiles of dogs on a map using real time location data and a unique map marker such as the dog's photo. The location of these dogs is found using the GPS location from their owner's smartphone, or can be found using Bluetooth enabled proximity sensors attached directly to the dog's collar, leash or body, which then sends data to the app via a smartphone. If smartphone GPS location is used, the owners of the dogs are assumed to be with their respective dogs unless specified otherwise. Another feature/function allows the owner to designate whether or not their dog is with them. The live location is constantly updated and location may be known/displayed in approximate real time. These profiles can be represented in many ways on the map, including by map point marker, dog profile photo, owner photos or other means of representing the location of one or more dogs. In addition to the location, the technology may gather historic data on locations visited.

The present invention uses GPS technology for social purposes and enables a full profile of a dog including pictures, age, and other traits or preferences, as well as descriptive details about the dog and the dog's owner. This allows other users of the relevant app and/or the dog's owner and friends to see their approximate real time location and open the dog's or dogs' profile. The user can then message or meet with other dogs and their owners. This solution is unique as no current technology or mobile app solutions offer an experience that maps dog profiles on a map for social purposes.

The profile itself is first created by one or more users of the app, who have the ability to upload pictures and descriptive information about their dog or dogs, as well as information about themselves. The profile photo they choose may be used in the map marker to identify the dog to other users. Even though the user can designate a location (city, state) or it can be found using FACEBOOK® information, the actual live location is obtained through the GPS information of the smartphone. This feature permits the owner of the dog to find and possibly meet with other dog owners in a nearby location.

The technology uses the GPS location from a smartphone or similar GPS enabled mobile device which is running the app (in this case, the mobile app called BARKHAPPY®.) The technology in the BARKHAPPY® app then displays this location on a map in a map marker using the dogs profile photo (this can also be a map marker point or another image instead of photo). The smartphone is assumed to be with the dog's owner and the dog is assumed to be with the owner.

Another feature in the app allows the user of the app to toggle "out with my dog" as on or off. If the toggle is on, then the location of the dog is found and displayed on the map or shown as "nearby" to other users. If the toggle is off, location is not received and the dog profile is not displayed on the map or shown as "nearby".

Users of the app can also search for potentially compatible owners and dogs using a variety of traits. For example, breed, age, gender, and personality characteristics can be set up as searchable traits within the app. Thus, users can search for other owners and their dogs based on a series of traits.

The disclosed system also displays dog friendly points of interest and businesses nearby using special markers on a map with useful information across various categories including, but not limited to the following: bars and restaurants; parks and playgrounds; medical services; events and entertainment; doggie daycare; and shopping. Dog owners out walking with their dogs can use these locations to potentially meet with other dog owners having similar interests, as determined via the social profile feature.

Referring now to FIGS. 7-10, several exemplary screen shot flow diagrams are shown to help illustrate features of the present invention. Specifically, the "Login-Sign In/Up" feature (FIG. 7), the "Create Profile" feature (FIG. 8), the "Map View" feature and the "Business POI" feature (FIG. 9), and the "Dog POI" feature and the "Play Invite" feature (FIG. 10) are all shown.

Figure 7:
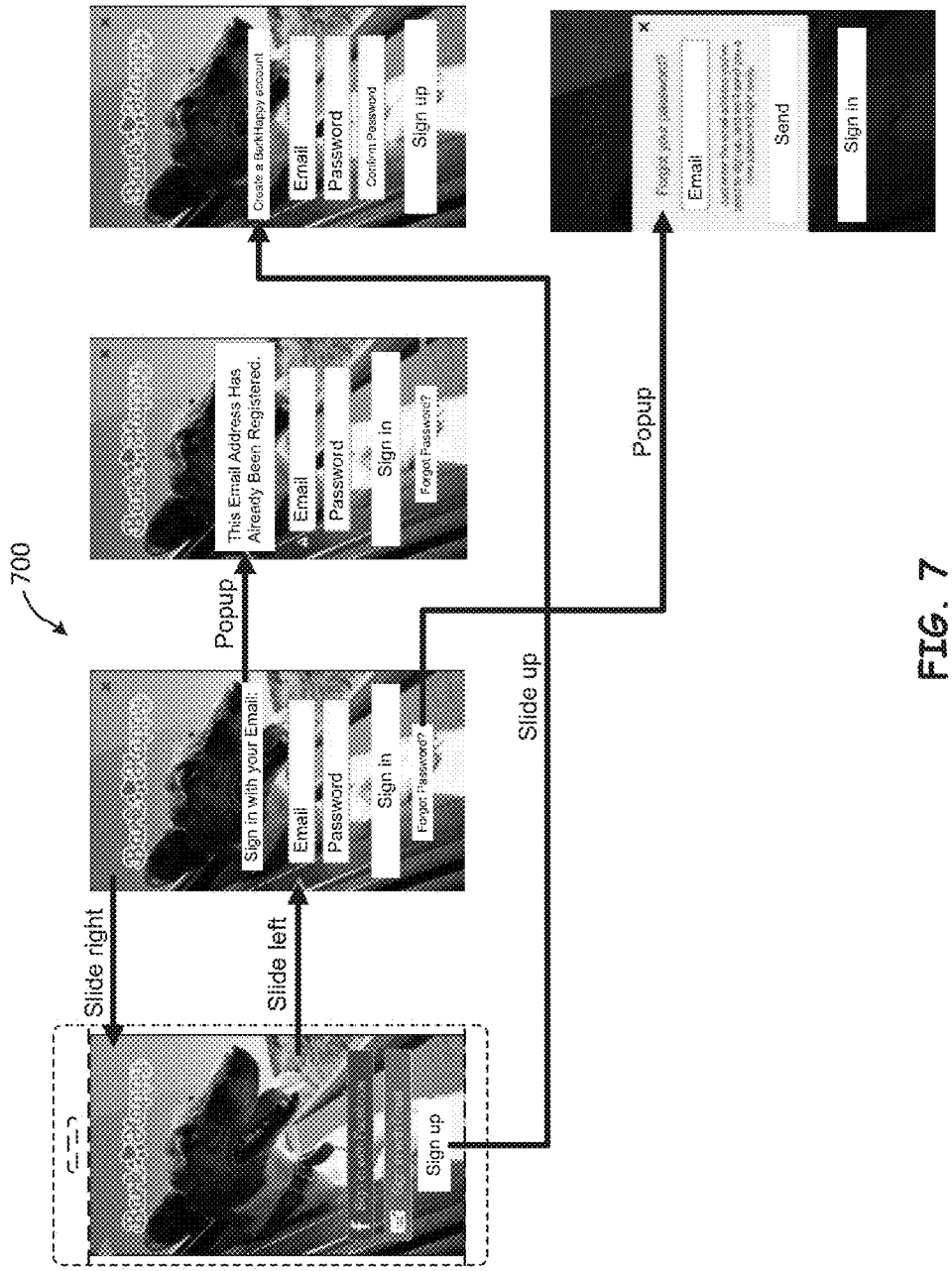
FIG. 7 is a sequence of screen shots from an exemplary application of a login and/or sign-in/up feature of the disclosed invention.

FIG. 7 is an exemplary diagram 700 of a login and/or sign-up/in sequence which is explained in greater detail below:

Login—Sign In/Up:
  'Sign in with Facebook' takes the user directly to step 2 after successful login.
  'Sign in with email' slides in the form fields from the right (tapping 'x' will slide in the previous screen from the left).
  If the user enters the wrong Email address or password, a transparent popup will show an error message and an icon will indicate on which field the error occurred.
  If the user tabs 'Sign Up', the sign up form slides in from the bottom (tapping 'x' will slide the splash screen buttons in from the top).
  If the user tabs on 'Forgot password', a full screen popup will open and prompt the user to enter an email address.
  All buttons should be disabled (50% transparent) until all required fields are filled.

Figure 8:
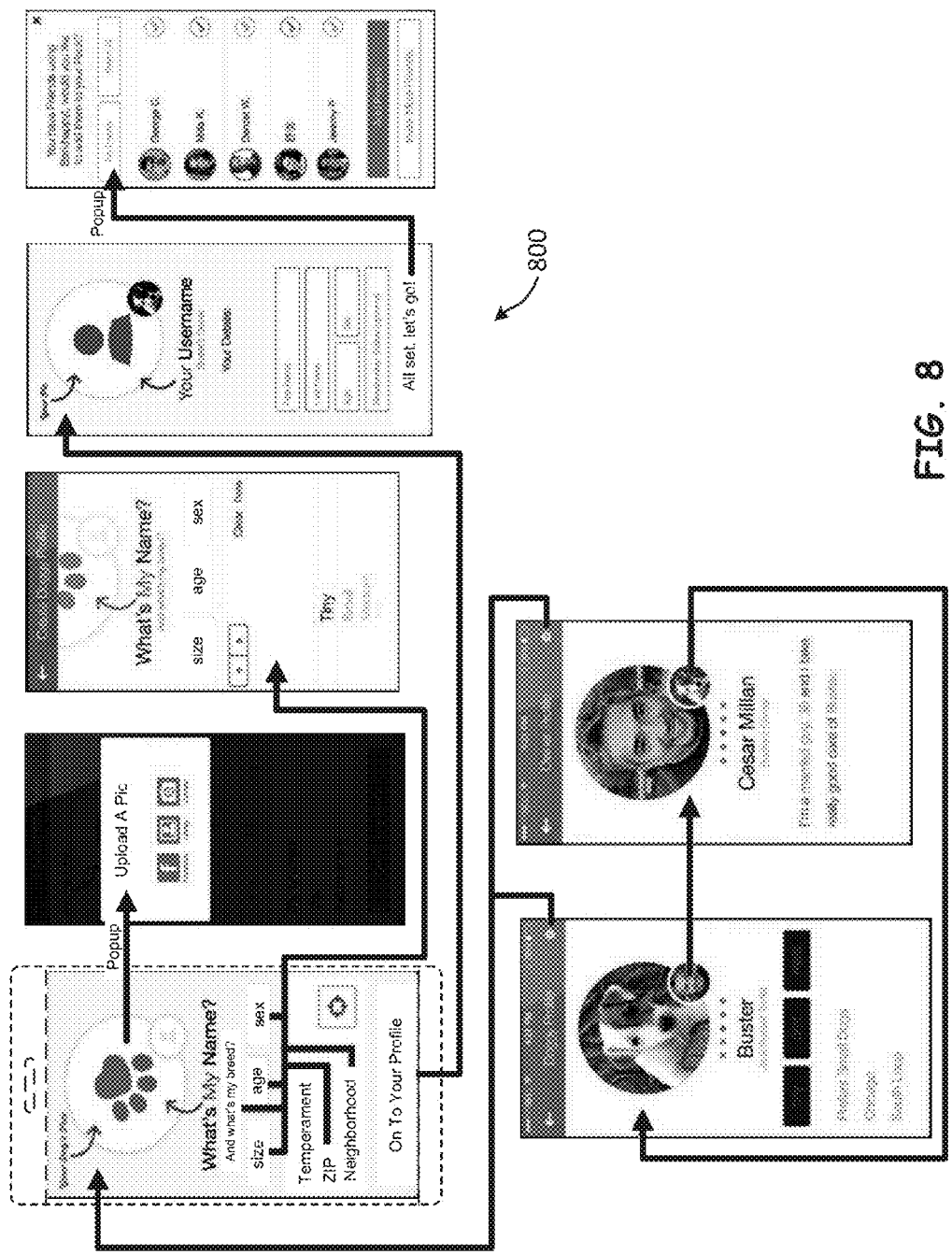
FIG. 8 is a sequence of screen shots from an exemplary application of a profile creation feature of the disclosed invention.

FIG. 8 is an exemplary diagram 800 of a profile creation sequence which is explained in greater detail below:

Create Profiles:
  Tapping the blank avatar opens a popup and lets you upload images from Facebook or the phone library, or allows you to use the camera to take a picture.
  Small avatar image is disabled (if user is logged in with Facebook it will show the FB avatar).
  Tapping 'what's my name' will open the iOS keyboard and lets the user enter a name (will replace the 'what's my name' text).
  Tapping on any of the other fields will open the iOS picker showing lists to choose info from.
  Optional: 'Locator' icon will prompt 'allow access to your location' popup and if accepted, fill 'ZIP' and 'neighborhood' fields automatically.
  Once the user hits 'on to your profile' all content (avatars, name, breed, etc.) flip horizontally to the left and show a blank user profile.
  If user is logged in with Facebook, image, name, age and sex fields are filled in automatically, and the 'relationship status' field will prompt a picker.
  'Busters Owner' field will be automatically filled with the name from the Doggy Profile.
  Once completed, a popup opens and asks the user to add friends that use BarkHappy or invite other friends.
  The popup then closes and the Map View shows.

Figure 9:
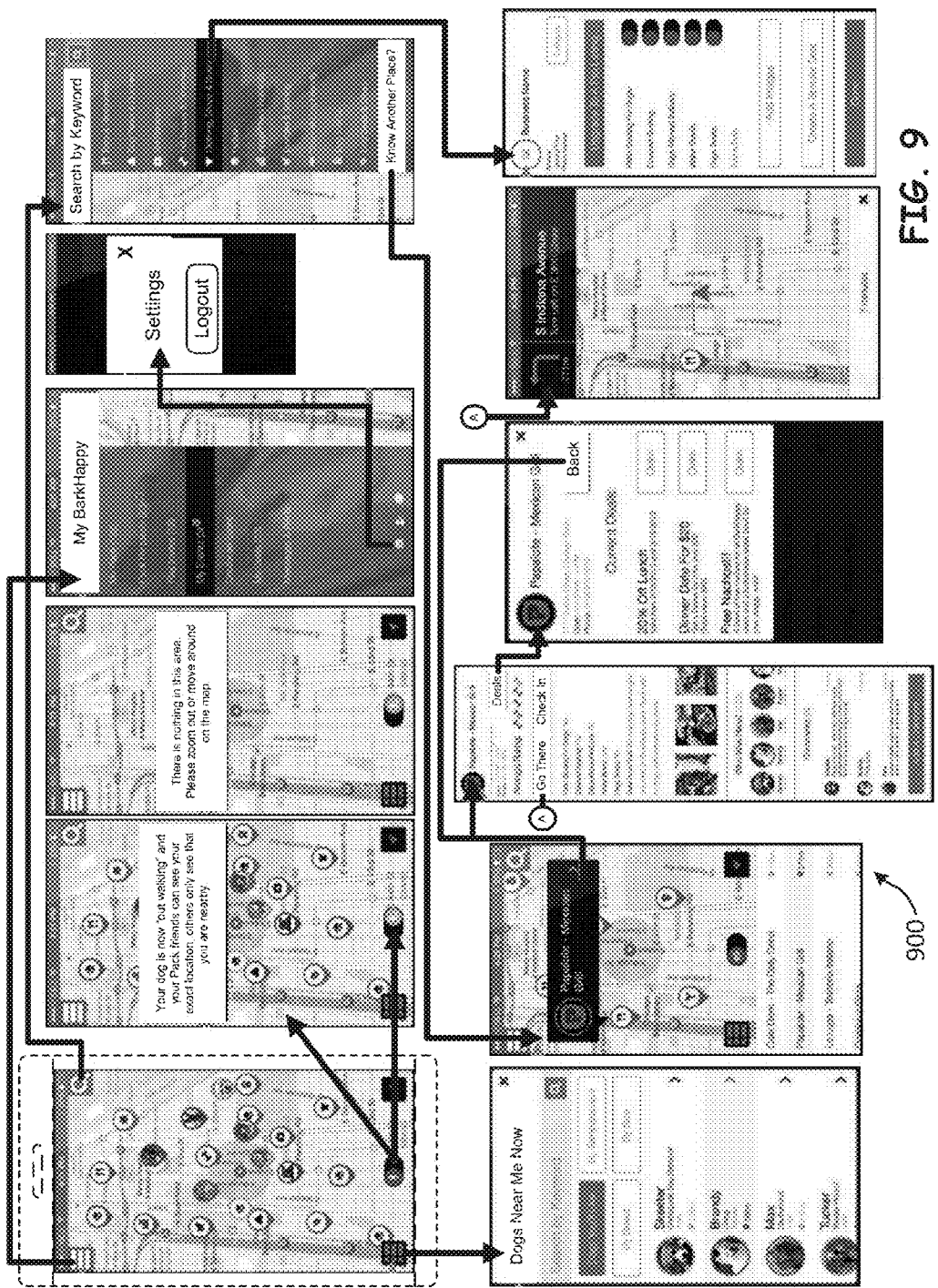
FIG. 9 is a sequence of screen shots from an exemplary application of a map view feature and a business point-of-interest (POI) feature of the disclosed invention.

FIG. 9 is an exemplary diagram 900 of a map view feature and a business point-of-interest feature sequence which are both explained in greater detail below:

Map View:
  Bottom toggle button lets the user switch between 'visible' and 'invisible' status. Once switched, a transparent popup shows for 2 seconds and then fades out automatically.
  If the user navigates to an area without POI, a transparent popup will inform him that there is no POI. Once there are POIs back on the map, the popup will fade out.
  If the user tabs the top left icon, the 'My BarkHappy' menu opens by sliding the map out of the screen (to the right).
  Tapping the 'Settings' icon will open a popup that lets the user logout.
  If the user tabs on the top right icon, the 'Search' menu opens by sliding the map out of the screen (as above but to the left).
  Tapping on an item will slide the map back and only the requested POI(s) are shown.
  If the user taps on the bottom left icon, a popup opens showing POIs nearby.

The business point-of-interest (POI) feature sequence is described below:

Business POI:
  If the user taps on a map pin, a transparent 'tooltip' popup opens and shows the avatar and name of the selected POI.
  If the user taps the 'tooltip' popup, a full screen popup shows with all of the POI details.
  Tapping on the 'Go there' button closes the popup and shows GPS info on the map.
  Tapping on the 'deals' button flips the popup horizontally (left) and shows details of the deals.

Tapping the 'back' button on the deals screen flips the popup (right), back to the POI info screen.

Figure 10:
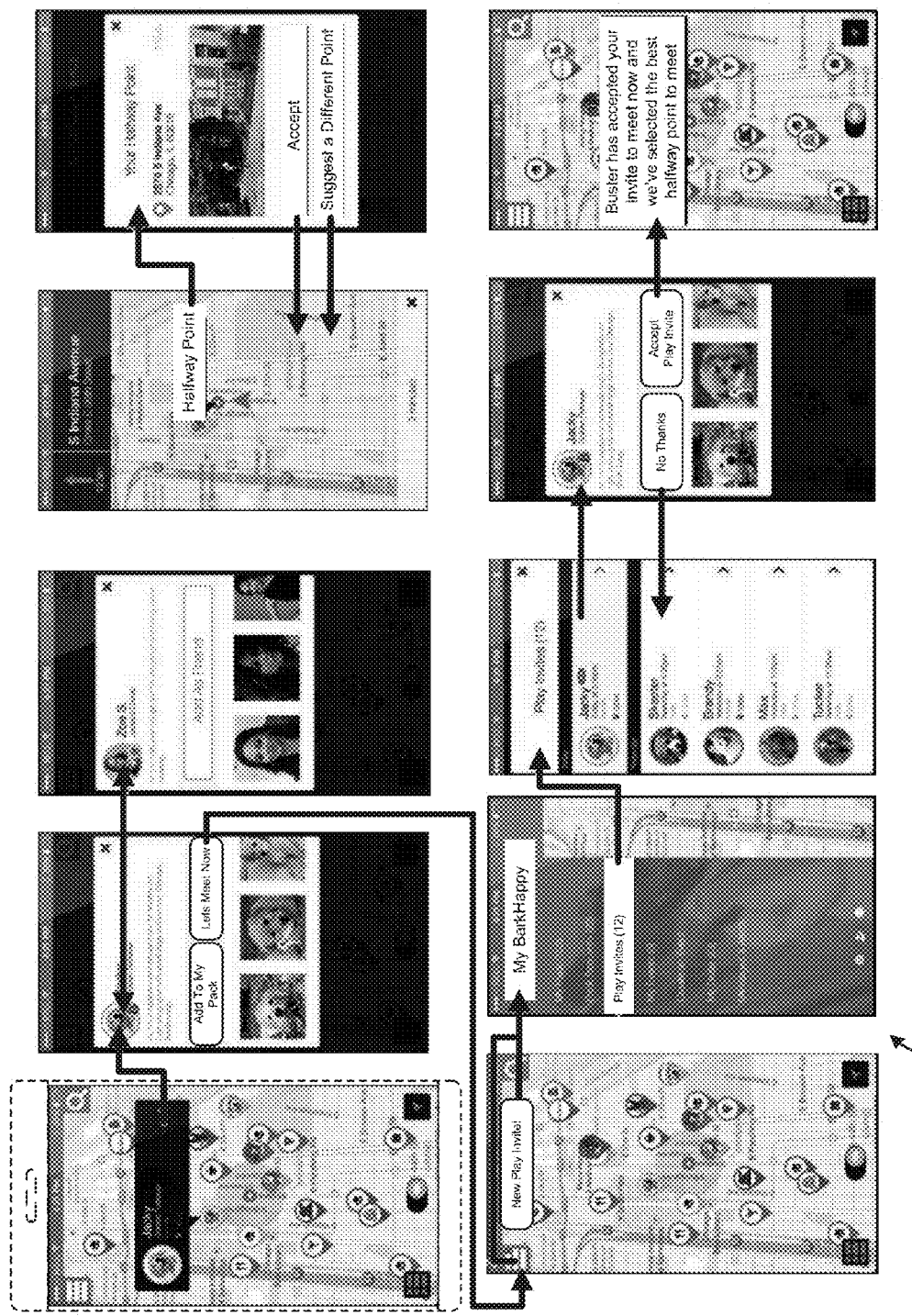
FIG. 10 is a sequence of screen shots from an exemplary application of a dog point-of-interest (POI) feature and a play invitation feature of the disclosed invention.

FIG. 10 is an exemplary diagram 1000 of a dog point-of-interest (POI) and play date invitation sequence which are explained in greater detail below:

Dog POI:

If the user tabs on a map pin, a transparent 'tooltip' popup opens and gives avatar and name of the selected POI.

If the user tabs the 'tooltip' a full screen popup shows with all the POI details.

Tapping on the avatar will flip the popup from 'Doggy Profile' to 'User Profile' and back.

Tapping 'Add to My Pack' sends a friend request and shows a transparent popup for 2 seconds which then fades out automatically.

The play invitation sequence is explained below:

Play Invites:

User is alerted that he has a new play invite. Indicated with an icon on the My BarkHappy icon and with a transparent popup that shows for a few seconds and then fades out.

If the user taps on either, the My BarkHappy menu opens (as described above).

If the user taps on 'Play Invites', a popup opens displaying all play invites.

If the user taps on a play invite, the popup flips horizontally (left).

If the user declines or taps 'x', the popup flips horizontally (right), back to the previous screen.

If the user accepts the invite, the popup closes and the GPS map shows with a meeting point selected and a transparent popup info message (showing for 2 seconds and then fading out).

If the user taps on the Halfway Point 'tooltip' a popup opens and asks the user to accept or suggest a different meeting point.

The described inventive concepts can embody many different forms and applications, and should not be limited to the embodiments described herein. Although described embodiments involve a mobile app for locating dog friendly points of interest, such as through the BARKHAPPY® mobile app, such concepts can also be utilized in conjunction with an online map or mobile app to connect with and meet people having similar interests. Such concepts are also useful as a social networking tool through display of social profiles for dogs and dog owners. Additional applications can include any number of possibilities where users from remote locations wish to find a convenient midway point for meetings, coffee, lunch, dinner, etc.

What is claimed is:

1. A method of establishing a meeting location for affiliates of primary users of mobile devices, comprising:
   receiving first geolocation information from a first mobile device in proximity to a first affiliated party, wherein proximity is determined, at least in part, from electronic data received from a device coupled to the first affiliated party;
   receiving second geolocation information from a second mobile device in proximity to a second affiliated party, wherein proximity is determined, at least in part, from electronic data received from a device coupled to the second affiliated party;
   determining an initial location of the first affiliated party based on the first geolocation information;
   determining an initial location of the second affiliated party based on the second geolocation information;
   calculating a distance between the first affiliated party and the second affiliated party based on the initial location of the first affiliated party and the initial location of the second affiliated party;
   identifying a meeting point for the first affiliated party and the second affiliated party based on the calculated distance;
   generating first routing information identifying a travel route between the initial location of the first affiliated party and the meeting point;
   generating second routing information identifying a travel route between the initial location of the second affiliated party and the meeting point;
   communicating the initial location of the second affiliated party, the meeting point and the first routing information for visual presentation on the first mobile device; and
   communicating the initial location of the first affiliated party, the meeting point and the second routing information for visual presentation on the second mobile device.

2. The method of claim 1, wherein at least one of the first affiliated party and the second affiliated party is a human unable to meaningful and independently interact with a mobile device.

3. The method of claim 1, wherein at least one of the first affiliated party and the second affiliated party is a dog.

4. The method of claim 1, wherein the first affiliated party and the second affiliated party are unable to meaningful and independently interact with the first mobile device and the second device, respectively, for purposes of identifying the meeting point.

5. The method of claim 1, wherein the meeting point is approximately equidistance from the initial location of the first affiliated party and the initial location of the second affiliated party.

6. The method of claim 1, further comprising:
   identifying at least one point of interest proximate the meeting point; and
   communicating the at least one point of interest for visual presentation on the first mobile device and second mobile device.

7. The method of claim 6, wherein the at least one point of interest is identified from a curated database of points of interest relevant to at least one of the first affiliated party and the second affiliated party.

8. The method of claim 7, further comprising:
   identifying additional points of interest proximate the travel route between the initial location of the first affiliated party and the meeting point and the travel route between the initial location of the second affiliated party and the meeting point; and
   communicating the additional points of interest for visual presentation on the first mobile device and the second mobile device.

9. The method of claim 1, wherein the device is a tracking device.

10. The method of claim 1, further comprising:
    receiving a request, from the first mobile device or the second mobile device, to identify a new meeting point;
    in response to the request, identifying a new meeting point; and
    communicating the new meeting point for visual presentation on the first mobile device and the second mobile device.

11. The method of claim 1, further comprising:
communicating profile information relating to the second affiliated party and a user of the second mobile device for presentation on the first mobile device.

12. The method of claim 1, further comprising:
receiving a request, from the first mobile device, to meet with the second affiliated party; and
receiving, from the second mobile device, an acceptance of the request.

13. A server supporting an application installed on a first mobile device and a second mobile device, the server comprising:
a communication interface configured to operate via a network to communicate with and receive information from the first mobile device and the second mobile device;
processing circuitry operably coupled to the communication interface;
memory coupled to the processing circuitry; and
program code stored in the memory, wherein the processing circuitry and communications interface operate according to the program code to:
receive first geolocation information from the first mobile device, the first mobile device in proximity to a first affiliated party, wherein proximity is determined, at least in part, from electronic data received from a device coupled to the first affiliated party;
receive second geolocation information from the second mobile device, the second mobile device in proximity to a second affiliated party, wherein proximity is determined, at least in part, from electronic data received from a device coupled to the second affiliated party;
determine an initial location of the first affiliated party based on the first geolocation information;
determine an initial location of the second affiliated party based on the second geolocation information;
identify a meeting point for the first affiliated party and the second affiliated party based on a calculated distance between the first affiliated party and the second affiliated party;
generate first routing information identifying a travel route between the initial location of the first affiliated party and the meeting point;
generate second routing information identifying a travel route between the initial location of the second affiliated party and the meeting point;
communicate the initial location of the second affiliated party, the meeting point and the first routing information for visual presentation on the first mobile device; and
communicate the initial location of the first affiliated party, the meeting point and the second routing information for visual presentation on the second mobile device.

14. The server of claim 13, wherein the processing circuitry and the communications interface further operate according to the program code to:
identify at least one point of interest proximate the meeting point; and
communicate the at least one point of interest for visual presentation on the first mobile device and second mobile device.

15. The server of claim 14, the memory maintaining a database of potential points of interest, wherein the at least one point of interest is identified from the database of potential points of interest.

16. The server of claim 13, wherein the processing circuitry and the communications interface further operate according to the program code to:
identify additional points of interest proximate the travel route between the initial location of the first affiliated party and the meeting point and the travel route between the initial location of the second affiliated party and the meeting point; and
communicate the additional points of interest for visual presentation on the first mobile device and the second mobile device.

17. The server of claim 13, wherein the meeting point is approximately equidistance from the initial location of the first affiliated party and the initial location of the second affiliated party.

18. The server of claim 13, wherein the processing circuitry and the communications interface further operate according to the program code to:
receive a request, from the first mobile device or the second mobile device, to identify a new meeting point;
in response to the request, identify a new meeting point; and
communicate the new meeting point for visual presentation on the first mobile device and the second mobile device.

19. The server of claim 13, wherein the processing circuitry and the communications interface further operate according to the program code to:
receive profile information relating to the second affiliated party and a user of the second mobile device; and
communicate the profile information for presentation on the first mobile device.

20. The server of claim 13, wherein the processing circuitry and the communications interface further operate according to the program code to:
prior to identifying a meeting point for the first affiliated party and the second affiliated party, receive a request, from the first mobile device, to meet with the second affiliated party;
communicate the request to the second mobile device; and
receive, from the second mobile device, an acceptance of the request.

* * * * *